(12) United States Patent  
Huang et al.

(10) Patent No.: US 9,047,453 B2  
(45) Date of Patent: Jun. 2, 2015

(54) UNLOCKING METHOD, COMPUTER READABLE STORAGE MEDIUM FOR STORING THEREOF AND HANDHELD ELECTRICAL DEVICE APPLYING THEREOF

(75) Inventors: Chun-Hsiang Huang, Taoyuan (TW); Tai-Ling Lu, Taoyuan (TW); Chih-Kuang Wang, Taoyuan (TW)

(73) Assignee: HTC CORPORATION, Taoyuan, Taoyuan County (TW)

( * ) Notice: Subject to any disclaimer, the term of this patent is extended or adjusted under 35 U.S.C. 154(b) by 36 days.

(21) Appl. No.: 13/104,173

(22) Filed: May 10, 2011

(65) Prior Publication Data

US 2012/0291121 A1 Nov. 15, 2012

(51) Int. Cl.
*G06F 21/00* (2013.01)
*G06F 21/32* (2013.01)

(52) U.S. Cl.
CPC ...................... *G06F 21/32* (2013.01)

(58) Field of Classification Search
USPC ............................................. 726/22; 713/182
See application file for complete search history.

(56) References Cited

U.S. PATENT DOCUMENTS

| | | | |
|---|---|---|---|
| 7,979,053 B2 | 7/2011 | Hsu | |
| 2002/0080192 A1* | 6/2002 | King et al. | 345/811 |
| 2005/0022005 A1* | 1/2005 | McKeeth | 713/200 |
| 2005/0097563 A1 | 5/2005 | Bidet et al. | |
| 2007/0015490 A1* | 1/2007 | Munje et al. | 455/410 |
| 2007/0250920 A1 | 10/2007 | Lindsay | |
| 2009/0166099 A1 | 7/2009 | Chen et al. | |
| 2009/0259588 A1* | 10/2009 | Lindsay | 705/40 |
| 2010/0017872 A1* | 1/2010 | Goertz et al. | 726/16 |
| 2012/0084734 A1* | 4/2012 | Wilairat | 715/863 |

FOREIGN PATENT DOCUMENTS

| | | |
|---|---|---|
| CN | 101026822 A | 8/2007 |
| CN | 101409881 A | 4/2009 |
| CN | 101610309 A | 12/2009 |
| EP | 1592194 | 11/2005 |

OTHER PUBLICATIONS

China Office Action dated Feb. 19, 2014.
English translation of abstract of CN 101610309 A (published Dec. 23, 2009).

(Continued)

*Primary Examiner* — Christopher Brown
(74) *Attorney, Agent, or Firm* — McClure, Qualey & Rodack, LLP

(57) ABSTRACT

An unlocking method for a handheld electrical device with a normal mode and a limited mode is disclosed. The handheld electrical device in the normal mode is able to display all contents of an application installed on the handheld electrical device. The handheld electrical device in the limited mode is able to display only part of the contents of the application. The unlocking method includes the following steps: at least one unlocking input without a user account is obtained from an input unit of the handheld electrical device when the handheld electrical device is under a locked status. The unlocking input is compared with first preset data and second preset data to generate a comparison result. The locked status of the handheld electrical device is released according to the comparison result.

6 Claims, 2 Drawing Sheets

(56) References Cited

OTHER PUBLICATIONS

English translation of abstract of CN 101026822 A (published Aug. 29, 2007).

China Office Action dated Jul. 23, 2014.

English translation of abstract of CN 101409881 A (published Apr. 15, 2009).

\* cited by examiner

UNLOCKING METHOD, COMPUTER READABLE STORAGE MEDIUM FOR STORING THEREOF AND HANDHELD ELECTRICAL DEVICE APPLYING THEREOF

BACKGROUND

1. Technical Field

The present invention relates to an unlocking method, a computer readable storage medium for storing thereof and a handheld electrical device applying thereof. More particularly, the present invention relates to a multi-mode handheld electrical device, an unlocking method for thereof and a computer readable storage medium for storing the method thereof.

2. Description of Related Art

As 3C (Computer, Communications and Consumer) technology develops, there are more and more people utilizing handheld electrical devices in their daily life. Most common handheld electrical devices are personal digital assistants (PDA), mobile phones, smart phones etc. Since mobile electrical devices are designed much smaller and easy to carry, more and more people use handheld electrical device and more functions are developed for different users.

In the prior art, different filesystem permissions may be assigned according to user accounts, which can protect data stored on handheld electrical devices from being stolen. However, persons near the user of the handheld electrical device can recognize the filesystem permission retrieved according to the user account, which the user inputs. For example, if a wife asks her husband to show her the data stored on the husband's handheld electrical device, the husband can't log in with lower filesystem permission since most wives know their husband's user account. Hence, in this case, filesystem permissions assigned according to users' account can not protect users' privacy.

SUMMARY

According to one example of this invention, an unlocking method is provided. In the unlocking method, an unlocking input is obtained to be the factor for determining which mode the handheld electrical device enters when the handheld electrical device is under the locked status. The unlocking method may take the form of a computer program, and the computer program is stored in a computer readable storage medium. Hence, when a handheld electrical device reads the computer readable storage medium to load the computer program, the handheld electrical device can perform the unlocking method. The unlocking method is suitable for a handheld electrical device with a normal mode and a limited mode to execute. The handheld electrical device in the normal mode is able to display all contents of an application installed on the handheld electrical device. The handheld electrical device in the limited mode is able to display only part of the contents of the application. The unlocking method includes the following steps: when the handheld electrical device is under a locked status, at least one unlocking input without a user account is obtained from an input unit of the handheld electrical device. The unlocking input is compared with first preset data and second preset data to generate a comparison result. The locked status of the handheld electrical device is released according to the comparison result. When the unlocking input matches the first preset data, the locked status of the handheld electrical device is released and the handheld electrical device enters the normal mode. When the unlocking input matches the second preset data, the locked status of the handheld electrical device is released and the handheld electrical device enters the limited mode.

According to another example of this invention, a handheld electrical device is provided. When the handheld electrical device is under the locked status, an unlocking input, which is obtained through an input unit of the handheld electrical device, is taken as the factor for determining which mode the handheld electrical device enters. The handheld electrical device in the normal mode is able to display all contents of an application installed on the handheld electrical device. The handheld electrical device in the limited mode is able to display only part of the contents of the application. The handheld electrical device includes an input unit, a comparing module and a control module. When the handheld electrical device is under a locked status, the input unit generates at least one unlocking input without a user account. The comparing module compares the unlocking input with first preset data and second preset data to generate a comparison result. The control module releases the locked status of the handheld electrical device according to the comparison result. When the unlocking input matches the first preset data, the control module releases the locked status of the handheld electrical device and makes the handheld electrical device enter the normal mode. When the unlocking input matches the second preset data, the control module releases the locked status of the handheld electrical device and makes the handheld electrical device enter the limited mode.

Above all, since the unlocking input does not include the user account, which may be obtained easily by the user's relatives or friends, persons around the user of the handheld electrical device may not know if the handheld electrical device enters the normal mode or not according to the user account. If the scenario is that the wife wants to see the content stored in the husband's handheld electrical device, the husband can controls his handheld electrical device to enter the limited mode by the unlocking input without the user account, which may not be aware by the wife easily. The present invention can be applied in other scenarios to achieve similar advantage, which should not be limited in this disclosure.

These and other features, aspects, and advantages of the present invention will become better understood with reference to the following description and appended claims. It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the examples, with reference made to the accompanying drawings as follows.

DETAILED DESCRIPTION

Figure 1:
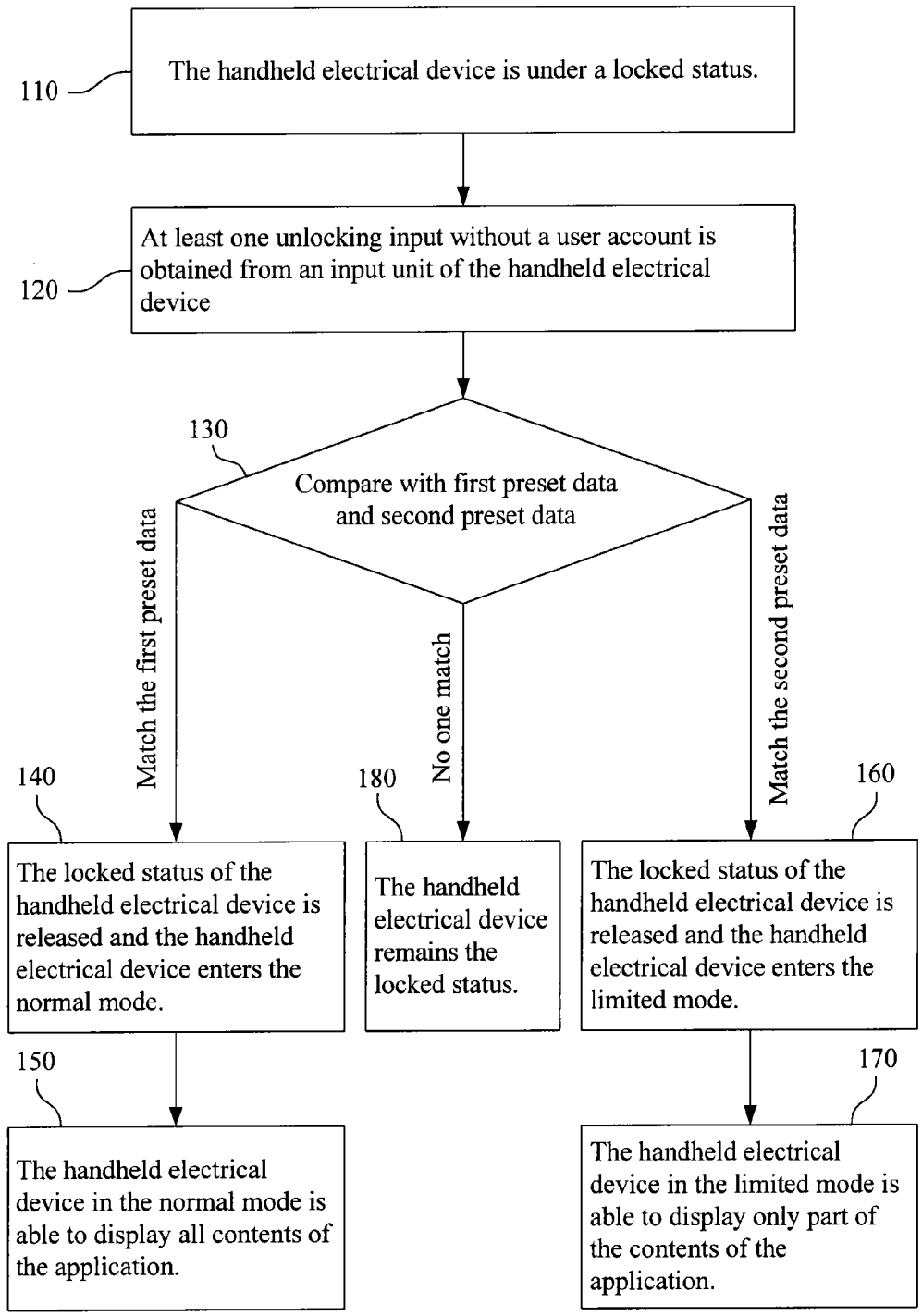
FIG. 1 illustrates a flow diagram of an unlocking method according to one example of this invention.

Reference will now be made in detail to the present examples of the invention, examples of which are illustrated in the accompanying drawings. Wherever possible, the same reference numbers are used in the drawings and the description to refer to the same or like parts.

FIG. 1 illustrates a flow diagram of an unlocking method according to one example of this invention. In the unlocking method, an unlocking input is obtained to be the factor for determining which mode the handheld electrical device enters when the handheld electrical device is under the locked status. The unlocking method may take the form of a computer program product stored on a computer-readable storage medium having computer-readable instructions embodied in the medium. Hence, when a handheld electrical device reads the computer readable storage medium to load the computer program, the handheld electrical device can perform the unlocking method. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

The unlocking method is suitable for a handheld electrical device with a normal mode and a limited mode to execute. The handheld electrical device in the normal mode is able to display all contents of an application installed on the handheld electrical device. The handheld electrical device in the limited mode is able to display only part of the contents of the application. The unlocking method 100 includes the following steps:

When the handheld electrical device is under a locked status (step 110), at least one unlocking input without a user account is obtained from an input unit of the handheld electrical device (step 120).

In step 130, the unlocking input is compared with first preset data and second preset data to generate a comparison result.

In step 140, when the unlocking input matches the first preset data, the locked status of the handheld electrical device is released and the handheld electrical device enters the normal mode.

Hence, in step 150, the handheld electrical device in the normal mode is able to display all contents of the application installed on the handheld electrical device.

In step 160, when the unlocking input matches the second preset data, the locked status of the handheld electrical device is released and the handheld electrical device enters the limited mode.

Hence, in step 170, the handheld electrical device in the limited mode is able to display only part of the contents of the application.

Therefore, the locked status of the handheld electrical device can be released according to the comparison result by executing steps 140~170. Besides, since the unlocking input does not include the user account, which may be obtained easily by the user's relatives or friends, persons around the user of the handheld electrical device may not know if the handheld electrical device enters the normal mode or not according to the user account. Therefore, if the scenario is that the wife wants to see the content stored in the husband's handheld electrical device, the husband can control his handheld electrical device to enter the limited mode by the unlocking input without the user account, which may not be aware by the wife easily. The present invention can be applied in other scenarios to achieve similar advantage, which should not be limited in this disclosure.

In step 180, when the unlocking input does not match either the first preset data or the second preset data, the handheld electrical device may remain the locked status. Therefore, the locked status of the handheld electrical device may not be unlocked by wrong input signals.

In addition, when the handheld electrical device is under the locked status, the handheld electrical device may display notice corresponding to the second preset data (for the limited mode). Therefore, the user other than the owner of the handheld electrical device may input the signal corresponding to the second preset data (for the limited mode) according to the displayed notice to unlock and make the handheld electrical device enter the limited mode, which can avoid that users other than the owner obtain the content stored in the handheld electrical device.

In one example of this invention, an input sketch generated through a touch screen may be taken as the unlocking input. Hence, the input unit of the handheld electrical device may be a touch screen, and the unlocking input may be an input sketch acquired from the touch screen. For example, the input sketch may be the sketch combined by at least one touched track sensed by the touch screen or other types of sketch. The first preset data may be a first unlocking sketch, and the second preset data may be a second unlocking sketch. Hence, the input sketch acquired from the touch screen can be taken as the unlocking input and be compared with the first preset data and the second preset data (step 130). Therefore, the user can touch the touch screen of the handheld electrical device to generate the unlocking input for unlocking and making the handheld electrical device enter his/her desired mode. Besides, since it's hard for persons around the users to notice that which sketch is input through touching, persons around the users of the handheld electrical device may not know which mode the handheld electrical device enters after unlock.

In another example of this invention, a fingerprint may be taken as the unlocking input. Hence, the input unit of the handheld electrical device may be a fingerprint scanner, the unlocking input may be an input fingerprint acquired from the fingerprint scanner, the first preset data may be a first unlocking fingerprint, and the second preset data may be a second unlocking fingerprint. Hence, the input fingerprint acquired from the fingerprint scanner can be taken as the unlocking input and be compared with the first preset data and the second preset data (step 130). Therefore, the user can use his/her fingerprint to unlock and make the handheld electrical device enter his/her desired mode. Besides, since it's hard for persons around the users to notice that which finger is utilized for input, persons around the users of the handheld electrical device may not know which mode the handheld electrical device enters after unlock.

In another example of this invention, an input password acquired from a keyboard may be taken as the unlocking input. Therefore, the input unit of the handheld electrical device may be a keyboard, the unlocking input may be an input password acquired from the keyboard, the first preset data may be a first unlocking password, and the second preset data may be a second unlocking password. Hence, the input password acquired from the keyboard can be taken as the unlocking input and be compared with the first preset data and the second preset data (step 130). Therefore, the user can input different password to unlock and make the handheld electrical device enter his/her desired mode.

Figure 2:
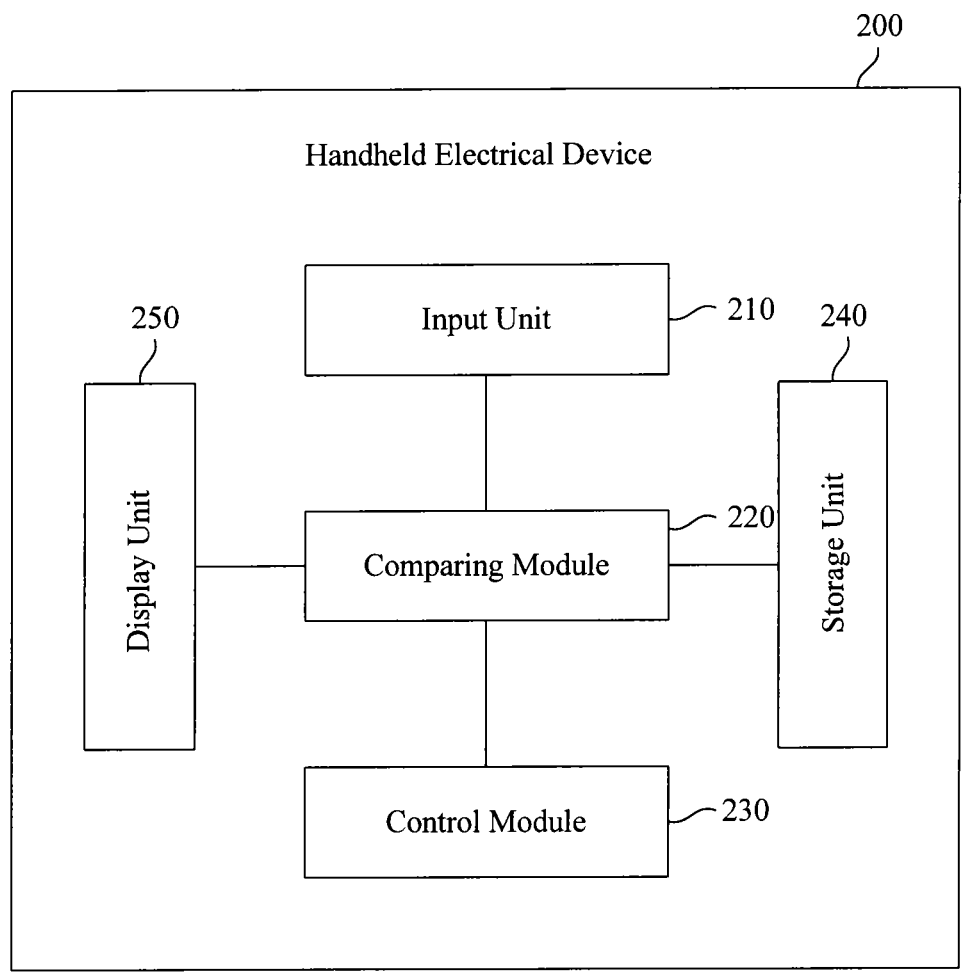
FIG. 2 illustrates a block diagram of a handheld electrical device according to one example of this invention.

FIG. 2 illustrates a block diagram of a handheld electrical device according to one example of this invention. When the handheld electrical device is under the locked status, an unlocking input, which is obtained through an input unit of the handheld electrical device, is taken as the factor for determining which mode the handheld electrical device enters. A normal mode and a limited mode are provided by the handheld electrical device. The handheld electrical device in the normal mode is able to display all contents of an application installed on the handheld electrical device. The handheld electrical device in the limited mode is able to display only part of the contents of the application.

The handheld electrical device 200 includes an input unit 210, a comparing module 220 and a control module 230. When the handheld electrical device 200 is under a locked status, the user can operates the input unit 210 to generate at least one unlocking input without a user account. The comparing module 220 compares the unlocking input with first preset data and second preset data to generate a comparison result.

The control module 230 releases the locked status of the handheld electrical device 200 according to the comparison result. When the unlocking input matches the first preset data, the control module 230 releases the locked status of the handheld electrical device 200 and makes the handheld electrical device 200 enter the normal mode. Hence, when the handheld electrical device 200 enters the normal mode, the handheld electrical device 200 in the normal mode is able to display all contents of the application installed on the handheld electrical device 200.

When the unlocking input matches the second preset data, the control module 230 releases the locked status of the handheld electrical device 200 and makes the handheld electrical device 200 enter the limited mode. Hence, the handheld electrical device 200 in the limited mode is able to display only part of the contents of the application. Wherein, the first preset data and the second preset data may be stored in a storage unit 240 in advance for comparison. Therefore, since the unlocking input does not include the user account, which may be obtained easily by the user's relatives or friends, persons around the user of the handheld electrical device 200 may not know if the handheld electrical device 200 enters the normal mode or not according to the user account. If the scenario is that the wife wants to see the content stored in the husband's handheld electrical device 200, the husband can make his handheld electrical device 200 enter the limited mode by the unlocking input without the user account, which may not be aware by the wife easily. The present invention can be applied in other scenarios to achieve similar advantage, which should not be limited in this disclosure.

When the comparing module 220 determines that the unlocking input does not match either the first preset data or the second preset data, the control module 230 may drive the handheld electrical device 200 to remain the locked status. Therefore, the locked status of the handheld electrical device 200 may not be unlocked by wrong input signals.

In addition, when the handheld electrical device 200 is under the locked status, a display unit 250 of the handheld electrical device 200 may display notice corresponding to the second preset data (for the limited mode). Therefore, the user other than the owner of the handheld electrical device 200 may input the signal corresponding to the second preset data (for the limited mode) according to the displayed notice to unlock and make the handheld electrical device 200 enter the limited mode, which can avoid that users other than the owner obtain the content stored in the handheld electrical device 200.

In one example of this invention, an input sketch acquired from a touch screen may be taken as the unlocking input. Hence, the input unit 210 may be a touch screen, and the unlocking input may be an input sketch acquired from the touch screen. For example, the input sketch may be the sketch combined by at least one touched track sensed by the touch screen (input unit 210) or other types of sketch. The first preset data may be a first unlocking sketch, and the second preset data may be a second unlocking sketch. Hence, the input sketch acquired from the touch screen can be taken as the unlocking input and be provided to the comparing module 220 for comparison. Therefore, the user can touch the touch screen of the handheld electrical device 200 to generate the unlocking input for unlocking and make the handheld electrical device 200 enter his/her desired mode. Besides, since it's hard for persons around the users to notice that which sketch is input through touching, persons around the users of the handheld electrical device 200 may not know if the handheld electrical device 200 enters the normal mode or not according to the user account.

In another example of this invention, a fingerprint may be taken as the unlocking input. Hence, the input unit 210 of the handheld electrical device 200 may be a fingerprint scanner, the unlocking input may be an input fingerprint acquired from the fingerprint scanner, the first preset data may be a first unlocking fingerprint, and the second preset data may be a second unlocking fingerprint. The input fingerprint acquired from the fingerprint scanner can be taken as the unlocking input and be provided to the comparing module 220 for comparison. Therefore, the user can use his/her fingerprint to unlock and make the handheld electrical device enter his/her desired mode. Besides, since it's hard for persons around the users to notice that which finger is utilized for input, persons around the users of the handheld electrical device 200 may not know if the handheld electrical device 200 enters the normal mode or not according to the user account.

In another example of this invention, an input password acquired from a keyboard may be taken as the unlocking input. Hence, the input unit 210 of the handheld electrical device 200 may be a keyboard, the unlocking input may be an input password acquired from the keyboard, the first preset data may be a first unlocking password, and the second preset data may be a second unlocking password. Hence, the input password acquired from the keyboard can be taken as the unlocking input and be provided to the comparing module 220 for comparison. Therefore, the user can input different password to unlock and make the handheld electrical device enter his/her desired mode.

Above all, since the unlocking input does not include the user account, which may be obtained easily by the user's relatives or friends, persons around the user of the handheld electrical device may not know if the handheld electrical device enter the normal mode or not according to the user account. If the scenario is that the wife wants to see the content stored in the husband's handheld electrical device, the husband can make his handheld electrical device enter the limited mode by the unlocking input without the user account, which may not be aware by the wife easily. The present invention can be applied in other scenarios to achieve similar advantage, which should not be limited in this disclosure.

Although the present invention has been described in considerable detail with reference to certain examples thereof, other examples are possible. Therefore, the spirit and scope of the appended claims should not be limited to the description of the examples contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An unlocking method for a handheld electrical device that includes a normal mode in which the handheld electrical device is allowed to display contents of an application, and a limited mode in which the handheld electrical device is limited to display only part of the contents of the application displayed in the normal mode, wherein the unlocking method comprises: displaying a notice that corresponds to unlocking with a second unlocking fingerprint corresponding to the limited mode on a display unit of the handheld electrical device under a locked status;

obtaining an input fingerprint acquired from a fingerprint scanner of the handheld electrical device under the locked status while the notice that corresponds to unlocking with the second unlocking fingerprint corresponding to the limited mode is displayed on the display unit of the handheld electrical device;

releasing the locked status of the handheld electrical device and making the handheld electrical device enter the normal mode based on a determination that the input fingerprint, which is obtained while the notice that corresponds to unlocking with the second unlocking fingerprint corresponding to the limited mode is displayed on the display unit of the handheld electrical device, matches a first unlocking fingerprint corresponding to the normal mode; and releasing the locked status of the handheld electrical device and making the handheld electrical device enter the limited mode based on a determination that the input fingerprint, which is obtained while the notice that corresponds to unlocking with the second unlocking fingerprint corresponding to the limited mode is displayed on the display unit of the handheld electrical device, matches the second unlocking fingerprint corresponding to the limited mode.

2. The unlocking method of claim 1, wherein the handheld electrical device is not limited to display only part of the contents of the application in the normal mode after making the handheld electrical device enter the limited mode.

3. A non-transitory computer readable storage medium for storing a program, wherein a handheld electrical device includes a normal mode in which the handheld electrical device is allowed to display contents of an application, and a limited mode in which the handheld electrical device is limited to display only part of the contents of the application displayed in the normal mode, and the handheld electrical device performs an unlocking method when the handheld electrical device reads the computer-readable storage medium and executes the program, the unlocking method comprises:

displaying a notice that corresponds to unlocking with a second unlocking fingerprint corresponding to the limited mode on a display unit of the handheld electrical device under a locked status;

obtaining an input fingerprint acquired from a fingerprint scanner of the handheld electrical device under the locked status while the notice that corresponds to unlocking with the second unlocking fingerprint corresponding to the limited mode is displayed on the display unit of the handheld electrical device;

releasing the locked status of the handheld electrical device and making the handheld electrical device enter the normal mode based on a determination that the input fingerprint, which is obtained while the notice that corresponds to unlocking with the second unlocking fingerprint corresponding to the limited mode is displayed on the display unit of the handheld electrical device, matches a first unlocking fingerprint corresponding to the normal mode; and releasing the locked status of the handheld electrical device and making the handheld electrical device enter the limited mode based on a determination that the input fingerprint, which is obtained while the notice that corresponds to unlocking with the second unlocking fingerprint corresponding to the limited mode is displayed on the display unit of the handheld electrical device, matches the second unlocking fingerprint corresponding to the limited mode.

4. The non-transitory computer readable storage medium of claim 3, wherein the handheld electrical device is not limited to display only part of the contents of the application in the normal mode after making the handheld electrical device enter the limited mode.

5. A handheld electrical device that includes a normal mode in which the handheld electrical device is allowed to display contents of an application, and a limited mode in which the handheld electrical device is limited to display only part of the contents of the application displayed in the normal mode, wherein the handheld electrical device comprises:

a display unit for displaying a notice that corresponds to unlocking with a second unlocking fingerprint corresponding to the limited mode thereon under a locked status;

a fingerprint scanner for generating an input fingerprint under the locked status while the notice that corresponds to unlocking with the second unlocking fingerprint corresponding to the limited mode is displayed on the display unit of the handheld electrical device;

a comparing module comprising a sub-module for comparing the input fingerprint with a first unlocking fingerprint and the second unlocking fingerprint to determine whether the input fingerprint matches the first unlocking fingerprint corresponding to the normal mode, or the second unlocking fingerprint corresponding to the limited mode; and a control module for releasing the locked status of the handheld electrical device and making the handheld electrical device enter the normal mode based on a determination that the input fingerprint, which is obtained while the notice that corresponds to unlocking with the second unlocking fingerprint corresponding to the limited mode is displayed on the display unit of the handheld electrical device, matches the first unlocking fingerprint made by the comparing module, and releasing the locked status of the handheld electrical device and making the handheld electrical device enter the limited mode based on a determination that the input fingerprint, which is obtained while the notice that corresponds to unlocking with the second unlocking fingerprint corresponding to the limited mode is displayed on the display unit of the handheld electrical device, matches the second unlocking fingerprint made by the comparing module.

6. The handheld electrical device of claim 5, wherein the handheld electrical device is not limited to display only part of the contents of the application in the normal mode after making the handheld electrical device enter the limited mode.

\* \* \* \* \*